(No Model.)
E. THOMSON.
SHIELDING DEVICE FOR ELECTRIC METERS.
No. 590,653. Patented Sept. 28, 1897.
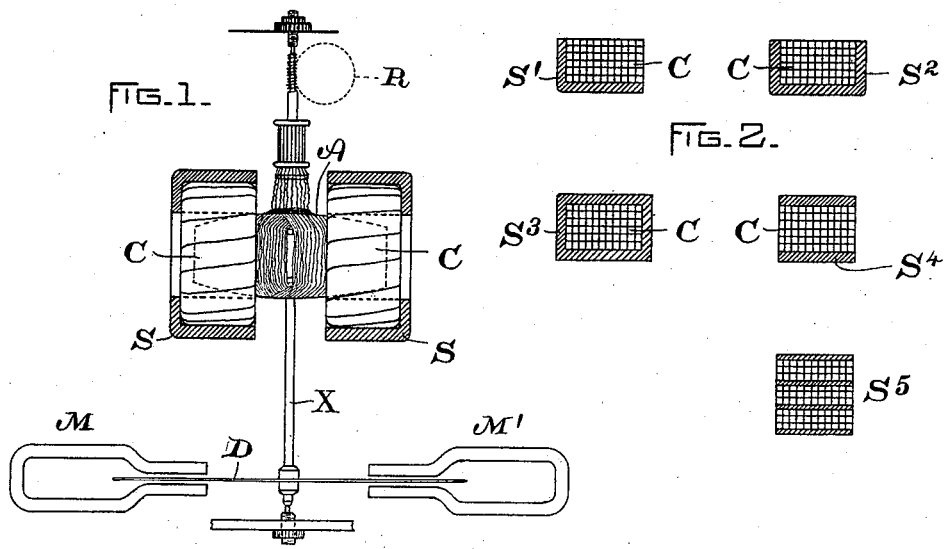
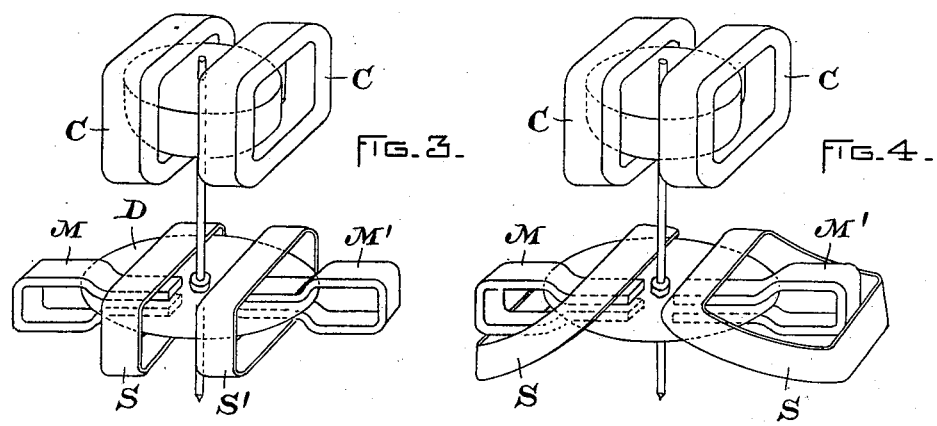
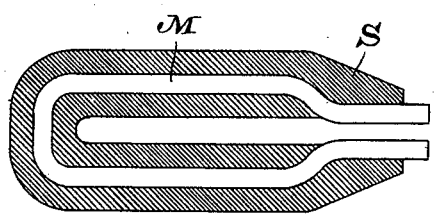
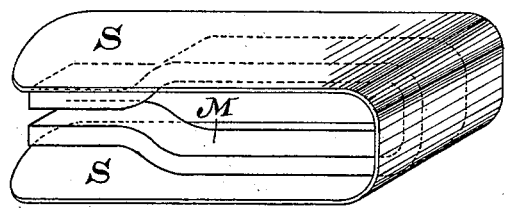
WITNESSES.
Henry O. Westendarp.
A. F. Macdonald.
INVENTOR
Elihu Thomson,
Geo. R. Blodgett,
Atty.

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

SHIELDING DEVICE FOR ELECTRIC METERS.

SPECIFICATION forming part of Letters Patent No. 590,653, dated September 28, 1897.

Application filed May 21, 1897. Serial No. 637,492. (No model.)

*To all whom it may concern:*

Be it known that I, ELIHU THOMSON, a citizen of the United States, residing at Swampscott, in the county of Essex, State of Massachusetts, have invented certain new and useful Improvements in Shielding Devices for Electric Meters, (Case No. 562,) of which the following is a specification.

The present invention relates to electric meters that are provided with magnetic damping devices, and has for its object to protect these magnets from magnetic influences due to passing through the meter extremely sudden and high currents, such as are occasioned by a momentary short-circuit, attended by the blowing of fuses or opening of circuit-breakers on the line to which the meter is attached. I have found that when a short-circuit occurs on a line in which an electric meter of any of the well-known types having damping-magnets is included in circuit the sudden instantaneous current of high value in passing through the load-coils of the meter will set up a magnetic field powerful enough to permanently weaken or change the magnetism of the damping-magnets, rendering the registration of the meter inaccurate to a certain degree.

In the accompanying drawings, attached to and made a part of this specification, Figure 1 is a partial front elevation of a meter embodying my invention. Fig. 2 is a modification of the shielding device shown in Fig. 1. Figs. 3 and 4 are modifications of the shielding device applied to the damping-magnets, and Figs. 5 and 6 are further modifications.

For the purpose of illustration the invention is shown as applied to the well-known Thomson recording-wattmeter, wherein A represents the armature mounted on shaft X and adapted to revolve within the influence of the field or load coils C. The armature is wound with fine-wire coils, which are connected to a commutator, and is connected in shunt across the supply-mains of the system. The load-coils are connected in series with one or more of the mains, and the current therein varies with the load on the consumption-circuit. To damp the rotation of the armature, a damping-disk D is mounted on the shaft X and revolves within the field of permanent magnets M and M'. At the upper end of the armature-shaft is a worm meshing with a worm-wheel R, which actuates any suitable registering mechanism. If a heavy current largely in excess of the normal working current flows either momentarily or for a prolonged interval through such a motor, a very intense magnetic field is created around the series field-coils. This magnetic field extends to a point where it affects the magnetism of the magnets M and M', either causing a loss or change in their magnetism. This will introduce inaccuracies into the registration of the meter. To overcome this objection, I provide each of the series or load coils C with a shield S, which consists of a conductor of good conductivity, made either of wire or plate, and arranged so as to form a circuit parallel to the conductors of the series coils C. In this case any sudden or instantaneous influx of current of large amount or a current greatly in excess of the capacity of the meter induces a similar large opposing current in the conductors or shields S, which prevent a sudden increase in magnetic effect, and thus prevents injury to the magnets M and M'.

In Fig. 2 is shown at S' a modification of the shield so arranged that it incloses the coils C on two sides. At $S^2$ the shield is shown as inclosing the coil on three sides, and at $S^3$ on all sides of the coil. At $S^4$ the shield is divided so as to make a casing surrounding the upper and lower or inner and outer sides of the coil. At $S^5$ the shield is divided and is placed between sections or turns of the series coils.

In Fig. 3 the shields S and S', consisting of closed bands of wire or sheet metal of good conductivity, surround the poles of the magnets M and M' and also a portion of the damping-disk D. The series coils C may or may not in this case be provided with a shield.

In Fig. 4 the shields are disposed in a slightly-different manner in that they do not surround the damping-disk D, but form closed coils around the magnets M and M'.

In Fig. 5 the shield S is carried as close to the magnet as possible, and comprises a heavy copper casting which completely surrounds the magnet with the exception of the ends and the space between the inner surfaces of the poles.

In Fig. 6 the magnet M is surrounded by a U-shaped sheet of heavy copper S, which is somewhat wider than the magnet in order to protect the sides from stray magnetic lines, and to protect the ends of the poles the shield is made a trifle longer than the magnet.

These various forms may be used either singly or together in carrying out my invention.

I have described my invention in connection with a meter which has an armature with a winding thereon, but I do not limit myself to this, for my invention will apply equally well to other types of motor mechanism.

What I claim as new, and desire to secure by Letters Patent of the United States, is—

1. The combination of an electric meter comprising, as part of its motor mechanism, a field coil or coils in circuit with the load, and a damping-magnet with a shield of copper or like highly-conducting metal forming a closed circuit or circuits within which currents are induced upon any sudden change in the magnetic field due to the field-coils, said shield being so arranged as to shield the damping-magnets from the effect of such changes in the magnetic field of the meter, as set forth.

2. The combination in an electric meter of an armature, field or load coils, a magnetic damping mechanism, and a copper or like shield forming the seat of induced currents surrounding the field coil or coils, as set forth.

3. The combination of an electric wattmeter having an armature wound with shunt-coils, a series field coil or coils, permanent magnets within the field of which revolves a disk of copper or like metal forming a magnetic damper, and a sheath of copper or like non-magnetic but highly-conducting metal inclosing more or less completely the field coil or coils of the meter, as set forth.

4. In an electric meter, the combination of a field-magnet, an armature, a magnetic damping mechanism, and means for producing a current in opposition to that flowing in the field-magnet for preventing a sudden increase in magnetic effect upon the passage of currents of abnormal magnitude through the field-circuit.

5. In a recording-wattmeter, the combination of a moving armature, stationary field-coils, a shield of good conducting material surrounding each of the field-coils, a disk carried by the armature-shaft, and magnets for damping the rotation of the armature.

In witness whereof I have hereunto set my hand this 18th day of May, 1897.

ELIHU THOMSON.

Witnesses:
JOHN W. GIBBONEY,
C. M. GREEN.